(12) United States Patent
Ben-Aderet et al.

(10) Patent No.: US 12,436,098 B2
(45) Date of Patent: Oct. 7, 2025

(54) OPEN PATH GAS DETECTOR BASED ON SPECTROMETER

(71) Applicant: SPECTRONIX LTD., Sderot (IL)

(72) Inventors: Yossi Ben-Aderet, Zikim (IL); Uzziel Sheintop, Haggay (IL)

(73) Assignee: SPECTRONIX LTD., Sderot (IL)

( * ) Notice: Subject to any disclaimer, the term of this patent is extended or adjusted under 35 U.S.C. 154(b) by 0 days.

(21) Appl. No.: 17/708,671

(22) Filed: Mar. 30, 2022

(65) Prior Publication Data

US 2023/0056282 A1    Feb. 23, 2023

Related U.S. Application Data

(60) Provisional application No. 63/234,839, filed on Aug. 19, 2021.

(51) Int. Cl.
| | |
|---|---|
| *G01N 21/3504* | (2014.01) |
| *G01J 3/02* | (2006.01) |
| *G01J 3/10* | (2006.01) |
| *G01J 3/42* | (2006.01) |
| *G01N 21/31* | (2006.01) |
| *G01N 21/359* | (2014.01) |

(52) U.S. Cl.
CPC ........ *G01N 21/3504* (2013.01); *G01J 3/0291* (2013.01); *G01J 3/108* (2013.01); *G01J 3/42* (2013.01); *G01N 21/359* (2013.01); *G01N 2021/3196* (2013.01)

(58) Field of Classification Search
CPC ....................................................... G01J 3/42
See application file for complete search history.

(56) References Cited

U.S. PATENT DOCUMENTS

| | | | |
|---|---|---|---|
| 6,061,141 A | 5/2000 | Goldenberg et al. | |
| 6,441,375 B1 * | 8/2002 | Joseph | G01N 21/3563 |
| | | | 250/339.09 |
| 6,455,851 B1 | 9/2002 | Lord et al. | |

(Continued)

FOREIGN PATENT DOCUMENTS

| | | |
|---|---|---|
| JP | 2001-291185 A2 | 10/2001 |
| KR | 101469071 B1 | 12/2014 |

(Continued)

OTHER PUBLICATIONS

Nah et al. ("Development of optical system for ARGO-M", JASS; 30(1):49-58 (2013)) (Year: 2013).*

(Continued)

*Primary Examiner* — Hina F Ayub
(74) *Attorney, Agent, or Firm* — Christopher R. Christenson; Kelly, Holt & Christenson, P.L.L.C.

(57) ABSTRACT

An open path gas detection system includes a transmitter and a receiver. The transmitter is configured to generate illumination, having broadband spectrum, across an open path. The receiver is positioned to detect the illumination from the transmitter after the illumination has passed through the open path. The receiver includes at least one spectrometer configured to determine spectroscopic information of the illumination to identify at least one gas of interest based on the spectroscopic information and provide an output based on the at least one gas of interest.

18 Claims, 8 Drawing Sheets

(56) References Cited

U.S. PATENT DOCUMENTS

| | | | |
|---|---|---|---|
| 6,538,728 B1* | 3/2003 | Stolle | G01N 21/31 356/437 |
| 7,372,673 B2 | 5/2008 | Spartz et al. | |
| 7,501,629 B2 | 3/2009 | Hashmonay | |
| 9,983,126 B2 | 5/2018 | Kotidis et al. | |
| 2002/0085200 A1* | 7/2002 | Herzinger | G01J 3/42 356/319 |
| 2002/0135762 A1* | 9/2002 | Wang | G01J 3/42 356/326 |
| 2003/0057383 A1 | 3/2003 | DiDomenico et al. | |
| 2003/0147080 A1 | 8/2003 | Sarkis et al. | |
| 2006/0237657 A1 | 10/2006 | Gamiles et al. | |
| 2007/0131882 A1* | 6/2007 | Richman | G01J 3/4338 250/573 |
| 2008/0285008 A1* | 11/2008 | Vachss | G01N 21/65 356/73 |
| 2009/0268205 A1* | 10/2009 | Naya | G01N 21/553 356/445 |
| 2012/0065948 A1* | 3/2012 | Tan | G01N 21/3504 703/2 |
| 2017/0045441 A1* | 2/2017 | Nciri | G01J 3/4406 |
| 2017/0102315 A1* | 4/2017 | Sawyers | G01J 3/02 |
| 2018/0024104 A1* | 1/2018 | Islam | G01J 3/453 250/341.1 |
| 2018/0180483 A1* | 6/2018 | Nowicki | G01J 5/0014 |
| 2019/0265123 A1* | 8/2019 | Rieker | G01N 33/0062 |
| 2019/0277757 A1* | 9/2019 | Frielinghaus | G01J 3/0291 |
| 2019/0317018 A1* | 10/2019 | Kobayashi | G01J 3/42 |
| 2021/0172868 A1* | 6/2021 | Shie | G01L 19/0092 |
| 2021/0239605 A1* | 8/2021 | Altug Yanik | G01N 21/4133 |
| 2022/0187203 A1* | 6/2022 | Zondlo | G01N 21/3504 |
| 2022/0268753 A1* | 8/2022 | Sobol | G01N 33/18 |
| 2022/0317039 A1* | 10/2022 | Irvam | G01N 21/39 |

FOREIGN PATENT DOCUMENTS

| | | |
|---|---|---|
| WO | 2009098694 A2 | 8/2009 |
| WO | WO2021043555 A1 | 3/2021 |

OTHER PUBLICATIONS

ESP Safety Inc, "TGAES Open Path Gas Detector", Specification Sheet, retrieved al <<https://espsafetyinc.com/products/combustible-gas-detectors/tgaes>>, retrieved on Mar. 30, 2022, 2 pages.

PKL Technologies Inc., "SPECTRA-1 TDLAS", Open Path Gas Detection, retrieved at <<http://www.enviro-analytical.com/doc_bin/PKL%20Brochure%204%20Page%20new.pdf>>, retrieved on Mar. 30, 2022, pp. 4.

Thoma, E.D., Shores, R.C., Thompson, E.L., Harris, D.B., Thorneloe, S.A., Varma, R.M., Hashmonay, R.A., Modrak, M.T., Natschke, D.F. and Gamble, H.A., 2005. Open-path tunable diode laser absorption spectroscopy for acquisition of fugitive emission flux data. Journal of the Air & Waste Management Association, 55(5). pp. 658-668.

Search Report Written Opinion Application No. PCT/US2022/038488. Dated Nov. 7, 2022, 12 pages.

Office Action for Canadian Patent Application No. 3229260, Dated Feb. 12, 2025, 3 pages.

Office Action for Chinese Patent Application No. 202210996446.9, Dated Apr. 18, 2025, 18 pages Including English Translation.

Search Report for European Patent Application No. 22858934.7, Dated May 8, 2025, 17 pages.

Office Action for Japanese Patent Application No. 2024-510354, Dated Apr. 15, 2025, 14 pages Including English Translation.

Second Office Action for Chinese Application No. 202210996446.9, mailed Aug. 8, 2025, 12 Pages.

* cited by examiner

OPEN PATH GAS DETECTOR BASED ON SPECTROMETER

CROSS-REFERENCE TO RELATED APPLICATIONS

The present application is based on and claims the benefit of U.S. Provisional Patent Application Ser. No. 63/234,839 filed Aug. 19, 2021; the content of which application is hereby incorporated by reference in its entirety.

BACKGROUND

Open Path Gas Detectors (OPGD) are line-of-sight gas monitors commonly installed to monitor for gas presence over long distances. Open Path Gas Detectors provide a high speed of response, they operate in extreme conditions, and require fewer instruments to monitor large areas. These detectors generally detect the unique spectral fingerprint of individual chemical substances. Such gas detectors typically consist of a pair of devices; a source unit and a detector unit. The source unit generates a high energy beam that passes through the open path. The target gas absorbs some of the irradiated energy and transmits the rest. The detector unit then detects the transmitted energy at specific spectral ranges, based on the target gas.

Figure 1A:
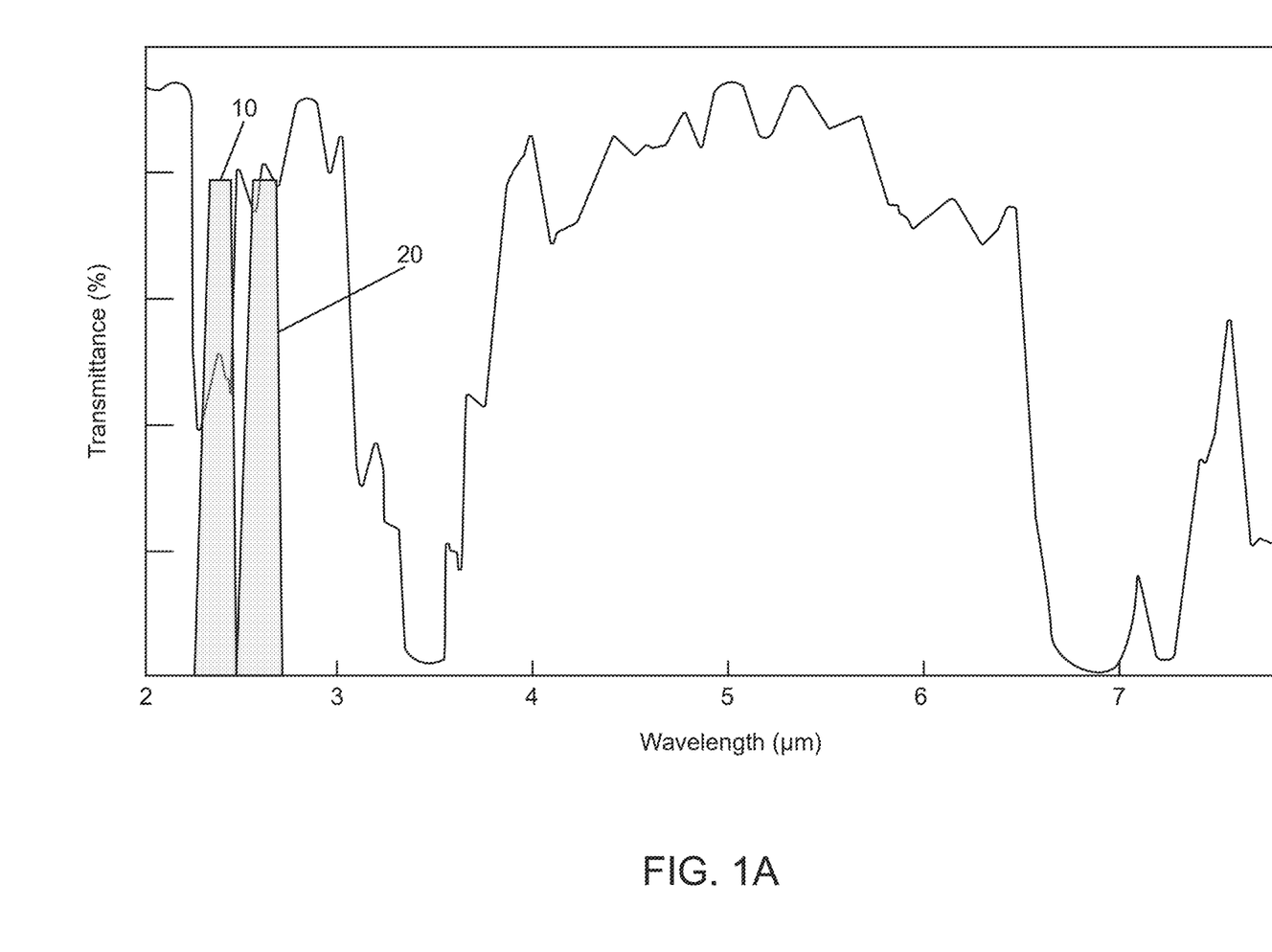
FIG. 1A is a graph of transmittance vs. wavelength for an open gas detector.

The use of non-dispersive infrared spectroscopy to detect hydrocarbon gases and UV spectroscopy to detect toxic and/or combustible gases is known. It essentially involves transmitting broadband radiation along a path in an area being monitored. The wavelengths of the radiation are chosen in between two different ranges; one is absorbed by the gas of interest and termed a signal (the "signal" wavelength is shown in box 10 in FIG. 1A). and one is chosen as a reference (the "reference" wavelength is shown in box 20 in FIG. 1A) in a different wavelength range in which the target gas does not exhibit significant absorption. The intensity of the radiation that has passed along the path in the area being monitored and the attenuation in the ratio (signal and reference) of the radiation provides a measure of the amount of target gas in the monitored area. However, factors other than absorption by the target gas can also attenuate the radiation, including interference or obscuration by rain, fog and/or steam, atmospheric scattering of the radiation, contamination of the lens surfaces (e.g., by dirt or condensation), and aging of components. In those cases, false alarms can result. Thus, the reliability of current open path gas detectors is limited.

Current open path gas detectors typically use an imaging system that includes a beam splitter for each detector; signal and reference. Each detector has a dedicated bandpass interference filter to allow the appropriate wavelength to be transmitted to the intended detector. In this arrangement, using a beam splitter, limits the maximum number of channels to two.

SUMMARY

An open path gas detection system includes a transmitter and a receiver. The transmitter is configured to generate illumination, having broadband spectrum wavelengths, across an open path. The receiver is positioned to detect the illumination from the transmitter after the illumination has passed through the open path. The receiver includes at least one spectrometer configured to determine spectroscopic information of the illumination to identify at least one gas of interest based on the spectroscopic information and provide an output based on the at least one gas of interest.

DETAILED DESCRIPTION OF ILLUSTRATIVE EMBODIMENTS

Embodiments described herein provide new optical open path gas detectors that use low-resolution spectrometers (in the range of the ultra-violet (UV) and/or the short-wave-infrared/Mid Infra-red (SWIR/MIDIR) for gas detection (such as toxic gas and/or hydrocarbons)). While current open path gas detectors offer acceptable sensitivity, they have relatively low immunity to false alarms and limited selectivity to gas. To overcome these hurdles, embodiments described herein provide an autonomous, miniaturized, low resolution, spectrometer UV and IR versions that are customized for diagnostic multi gases with high immunity to false alarms.

In accordance with embodiments described herein, radiation measurement is performed at more than one signal wavelength and more than one reference wavelength to significantly improve the performance and reduce the incidence of false alarms, while extending the gas selectivity and the reading accuracy. Embodiments described herein measure the spectral fingerprint of the gases and then calculate a ratio and the correlation at the different wavelengths where the target gas is absorbed.

Figure 1B:
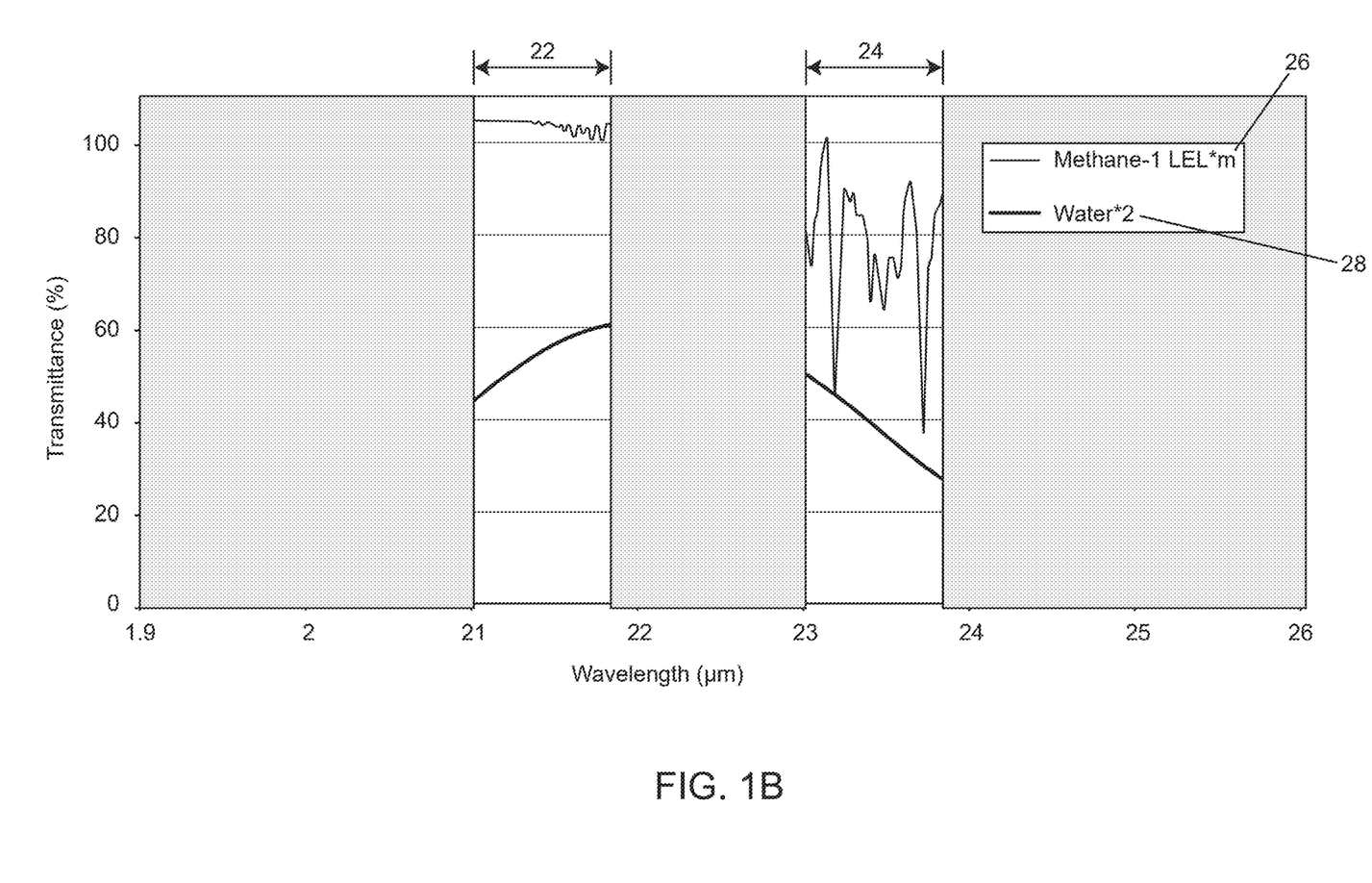
FIG. 1B is a graph of transmittance vs. wavelength in a pair of wavelength bands for methane and water.

FIG. 1B is a graph of transmittance vs. wavelength in a pair of wavelength bands for methane and water. FIG. 1B illustrates the limitation of current open path gas detectors that use two channels (i.e., a single signal and reference). FIG. 1B illustrates transmittance vs. wavelength in a pair of wavelength bands 22, 24 for an open path that contains both methane 26 and water vapor 28. In the case of methane and water vapor, for mid-infrared radiation, water, and water vapor, acted as particulates absorbing the specific electromagnetic radiation, which is a common cause of attenuation. This case can be protected from false alarms. In addition, scattering, diffraction, and other processes may also contribute and affect the signal. In this case, although it is necessary for the signal band to be insensitive to substances other than gases to avoid false alarms, this very aspect can produce errors when only two channels are used.

Figure 2A:
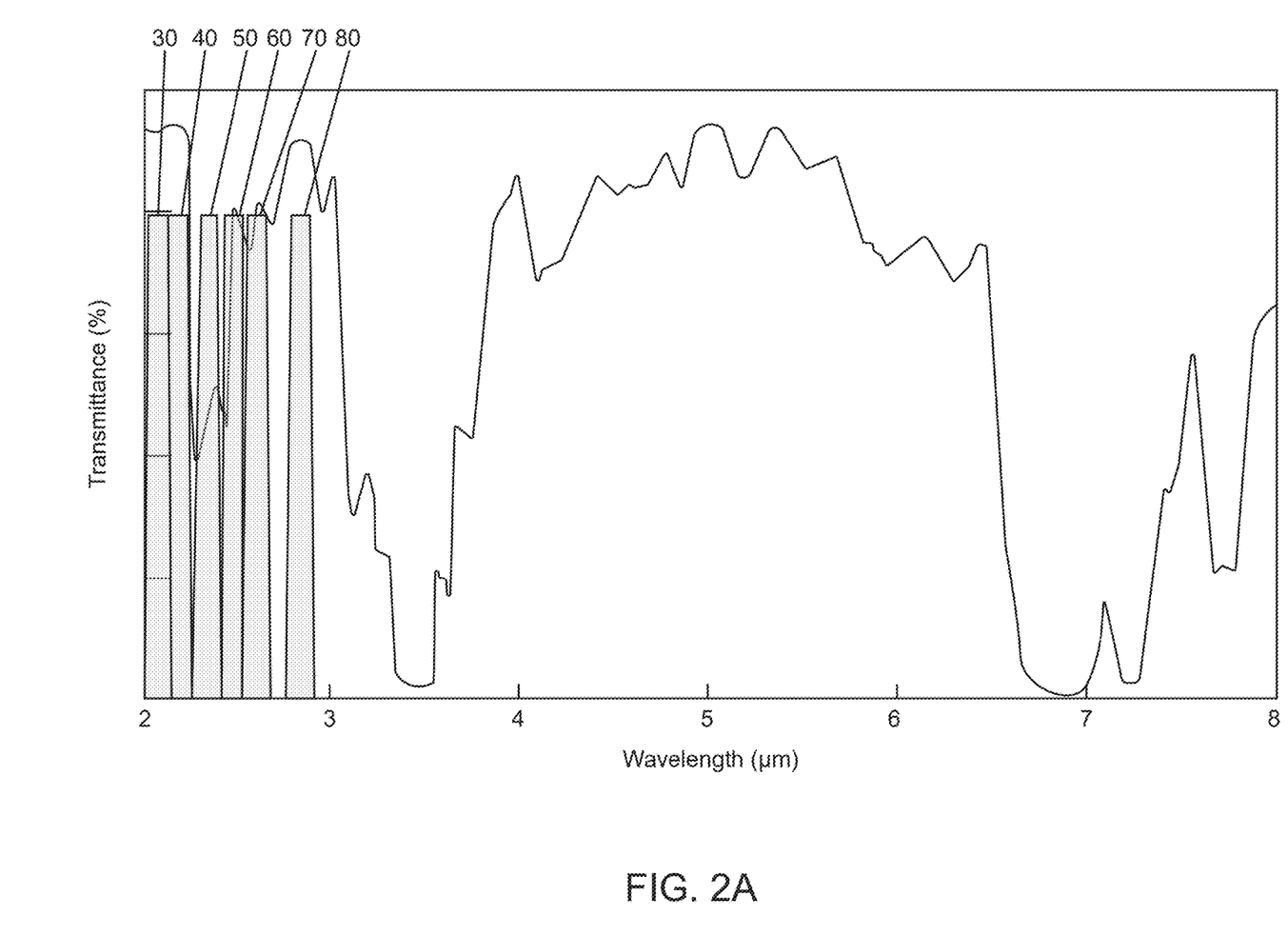
FIGS. 2A and 2B are graphs of transmittance vs. wavelength for an open gas detector using a variety of wavelengths in accordance with one embodiment.
Figure 2B:
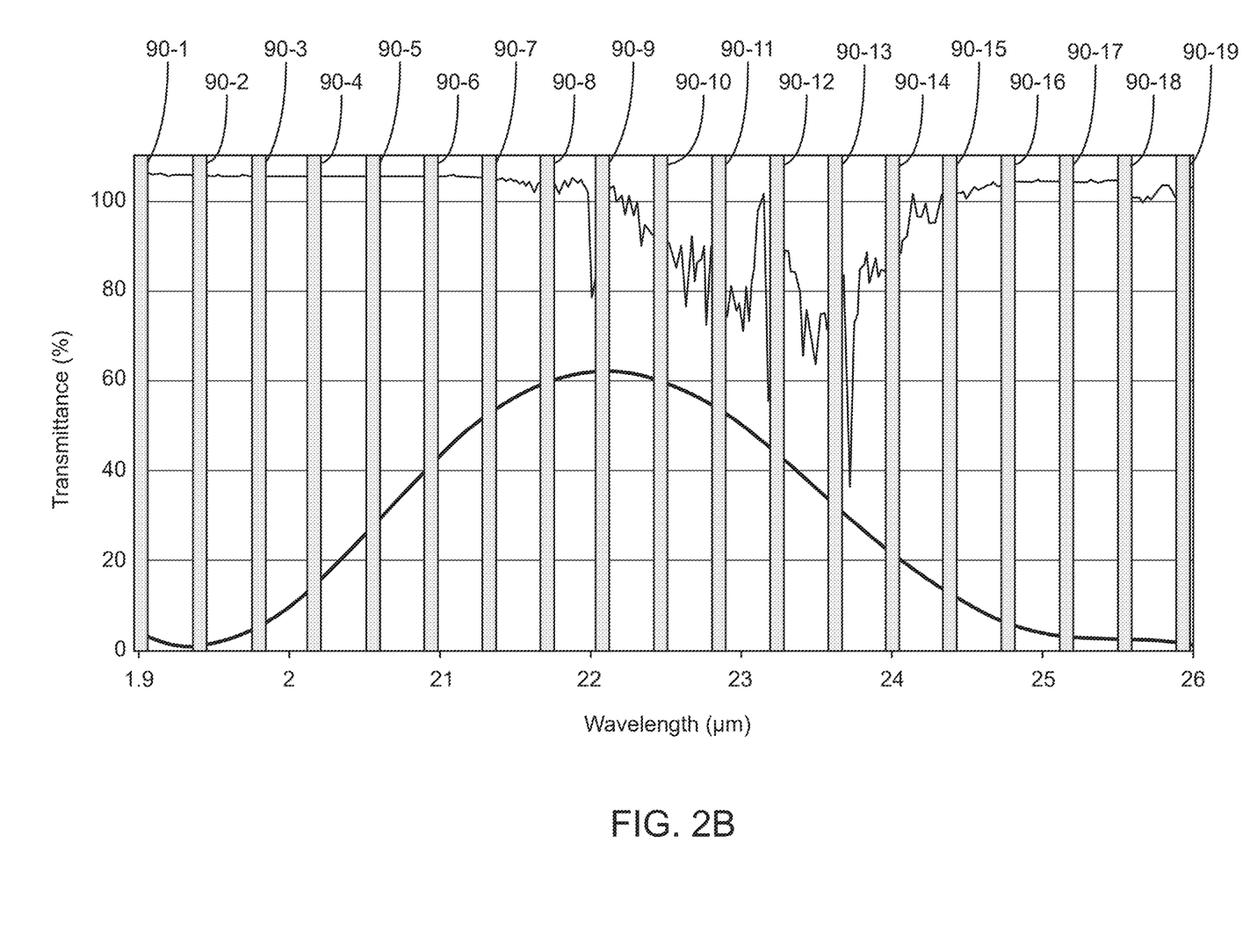

FIGS. 2A and 2B are graphs of transmittance vs. wavelength for an open gas detector using a variety of wavelengths in accordance with embodiment of the present invention. FIG. 2A shows a number of wavelength bands (30, 40, 50, 60, 70, 80) of interest in determining the presence and/or concentration of various gases in comparison to the two-channel approach shown in FIG. 1A. Similarly, FIG. 2B shows a number of wavelength bands of interest in determining the presence and/or concentration of various gases in comparison to the two-channel approach shown in FIG. 1B. More particularly, FIG. 2A illustrates six distinct wavelength bands having a bandwidth of about 0.15 µm between 2.0 and 3.0 µm in the near-infrared region. In another embodiment, FIG. 2B illustrates eighteen distinct wavelength bands 90-1, 90-2, . . . , 90-18, between 1.9 µm and 2.6 µm, each band having a bandwidth of approximately 0.038 µm. The utilization of such an increased number of wavelength bands, as shown in FIGS. 2A and 2B, allows the detection of only gases of interest and reduces the incidence of false alarms.

Figure 3:
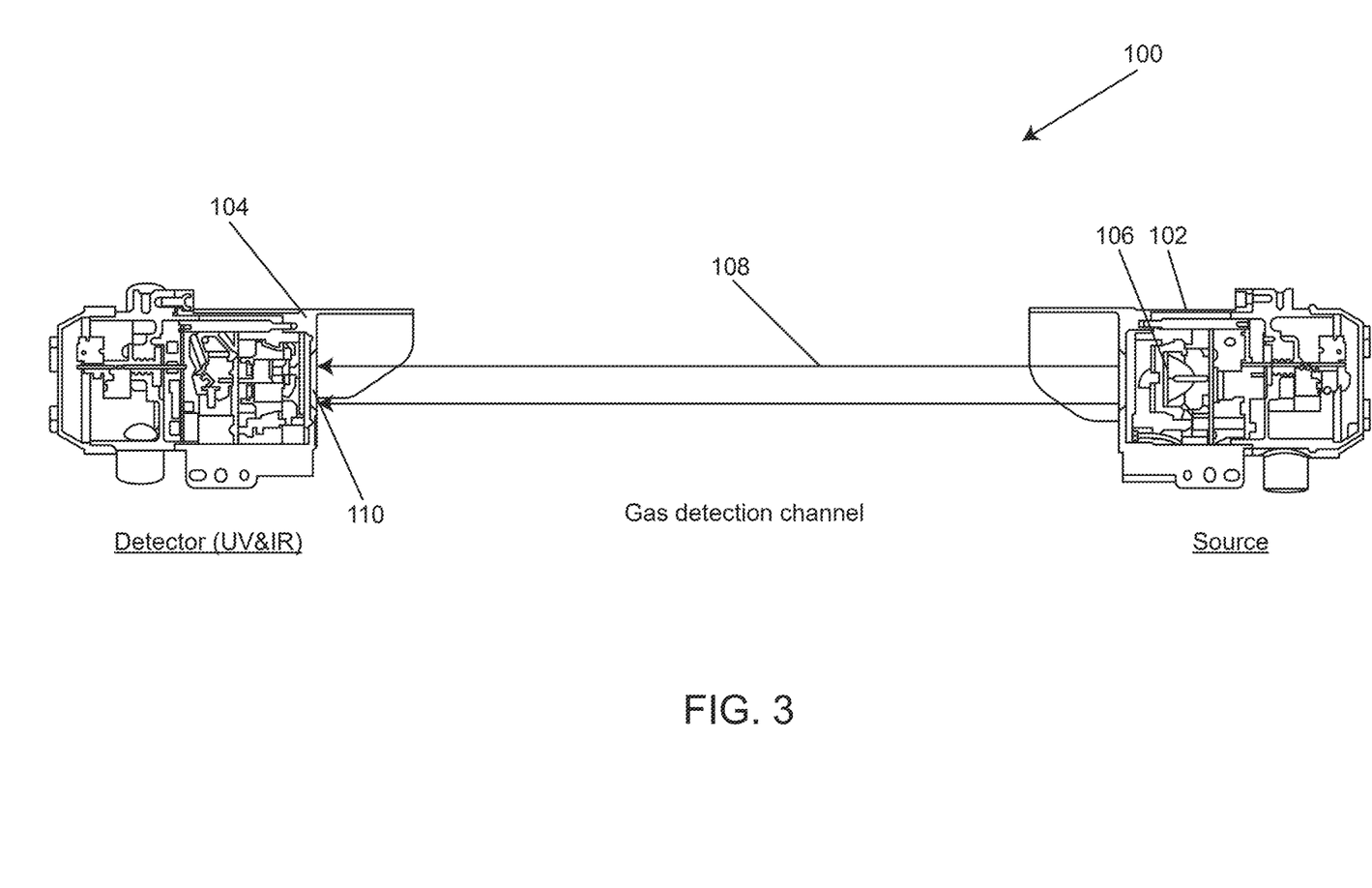
FIG. 3 is a diagrammatic view of an open path gas detector based on a spectrometer in accordance with one embodiment.

FIG. 3 is a diagrammatic view of an open path gas detector based on a spectrometer in accordance with one embodiment. Open gas detector 100 includes a transmitter or source 102 and receiver or detector 104. Source 102 includes an illumination source that generates illumination in a number of wavelengths. In some embodiments, the illumination wavelengths may range from IR to UV wavelengths. In other embodiments, the wavelength range within a smaller region, such as an IR pulse. Collimating optics 106 in source 102 are used to project a collimated beam of light 108 from transmitter 102 through the open path to receiver 104. Receiver 104 includes telescope optics 110 which capture the incoming light and focus the energy into a spectrometer (i.e., detector capable of real-time spectroscopic detection) for analysis. When the light passes through the open path of the atmosphere, it is affected by any compound (e.g., gas or water vapor) that is present in the beam path. In the case of gases in the open path, a unique combination of detection illumination at various wavelengths provides a "spectral fingerprint." In one embodiment, the receiver/detector 104 having the spectrometer also includes memory containing a list of spectral fingerprints of each gas of interest. This saved spectral fingerprint information, which is correlated to gasses of interest, allows the receiver/detector to analyze the received illumination to identify each gas. Accordingly, illumination collected by detector 104 from beam 108 after passing through the open path, is compared with the stored library references of the gases and a pattern-matching technique is used for analysis. Further, gas readings can be subjected to correlation factor thresholds such that readings are only reported if the correlation factor is high enough or otherwise exceeds the threshold. In accordance with embodiments described herein, multiple ratios of illumination levels of various signal bands to various reference bands can be employed in order to provide higher resolution.

In accordance with embodiments of the present invention, receiver 104 includes a spectrometer. This device detects spectrographic information from the light beam directly. Thus, the spectrometer is unlike a simple photodetector or even detectors that employ the Fourier Transform to derive spectral information, such as open-path Fourier transform infrared spectroscopy (OP-FTIR) systems. The spectrographic detector allows the simultaneous capture of a vast number of wavelength bands (such as the 18 bands shown in FIG. 2B, or more) which can then be analyzed by the receiver, as either signal bands or reference bands, to compare with the stored spectral fingerprints stored within the detector.

One example of a spectrometer that may be used in accordance with embodiments of the present invention is multi-channel spectrometer, such as a one-dimensional (1D) (Linear Array) or a two-dimensional (2D) silicon-based, charge-coupled device (CCD). A 2D CCD is a spectrometer with several thousand elements (pixels) generally arranged in a rectangle. Some 2D CCDs provide high responsiveness from the near infrared (NIR) region to 1.1 microns. At longer wavelengths, the photon energy is lower and specific materials should be used in the 2D CCD spectrometer. For example, indium gallium arsenide (InGaAs) provides suitable detection in the 0.9-1.7 µm range and spectrometers using this material are available in configurations that provide detection up to 2.0 µm. Other multichannel detectors using different materials such as HgCdTe or InSb are also available for longer wavelength detection. Still other multichannel detectors include, without limitation, PbS and/or PbSe sensors. In accordance with embodiments described herein, the receiver may include an NIR spectrometer and/or a UV spectrometer. 2D CCD arrays that are capable of spectroscopic detection are commercially available.

Figure 4A:
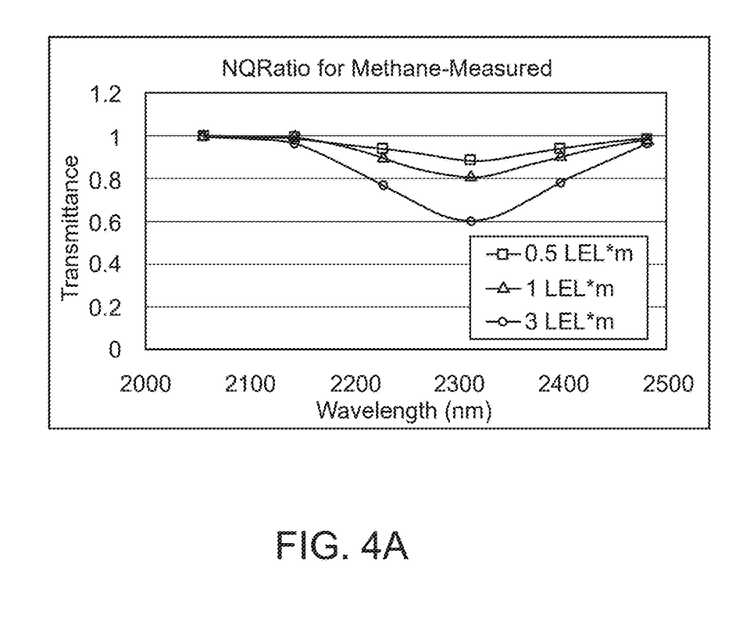
FIGS. 4A and 4B are graphs of measured and theoretical, respectively, transmittance vs wavelength in accordance with one embodiment.
Figure 4B:
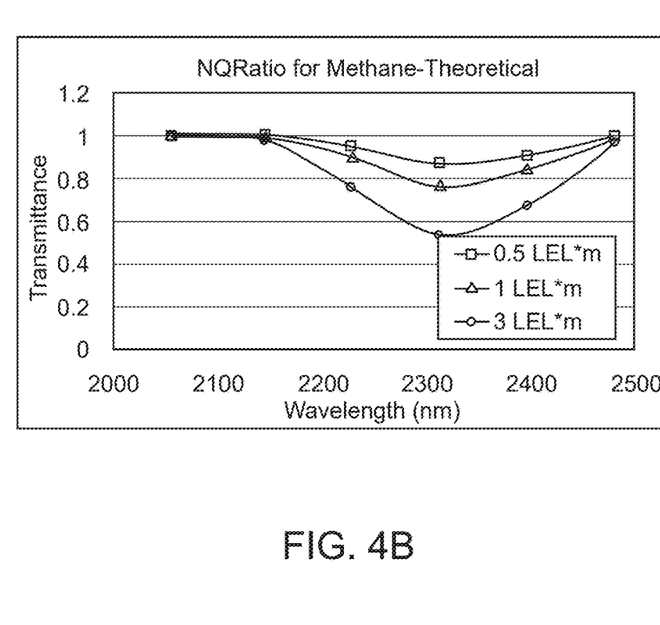

FIGS. 4A and 4B are graphs of measured and theoretical, respectively, transmittance vs wavelength in accordance with one embodiment. FIGS. 4A and 4B illustrate that the measured response of the open gas detector can deviate from the theoretical response. The receiver signal can be affected by the presence of other materials (i.e., materials other that the gas(es) of interest between the radiation source and the receiver. For example, for infrared radiation water vapor and/or particles such as dust can be of special concern. Reduction in signal can be caused by absorption of electromagnetic radiation in the gas of interest but may also be attenuated by scattering or occlusion by dust in the path or dirt on the optical elements. If a beam is attenuated, by water vapor for example, the spectral fingerprint is at a different wavelength than the gases and will be rejected and not pass the pattern-matching analysis. In this way, embodiments described herein provide high immunity to false alarms while still providing high selectivity to gases of interest.

Figure 5:
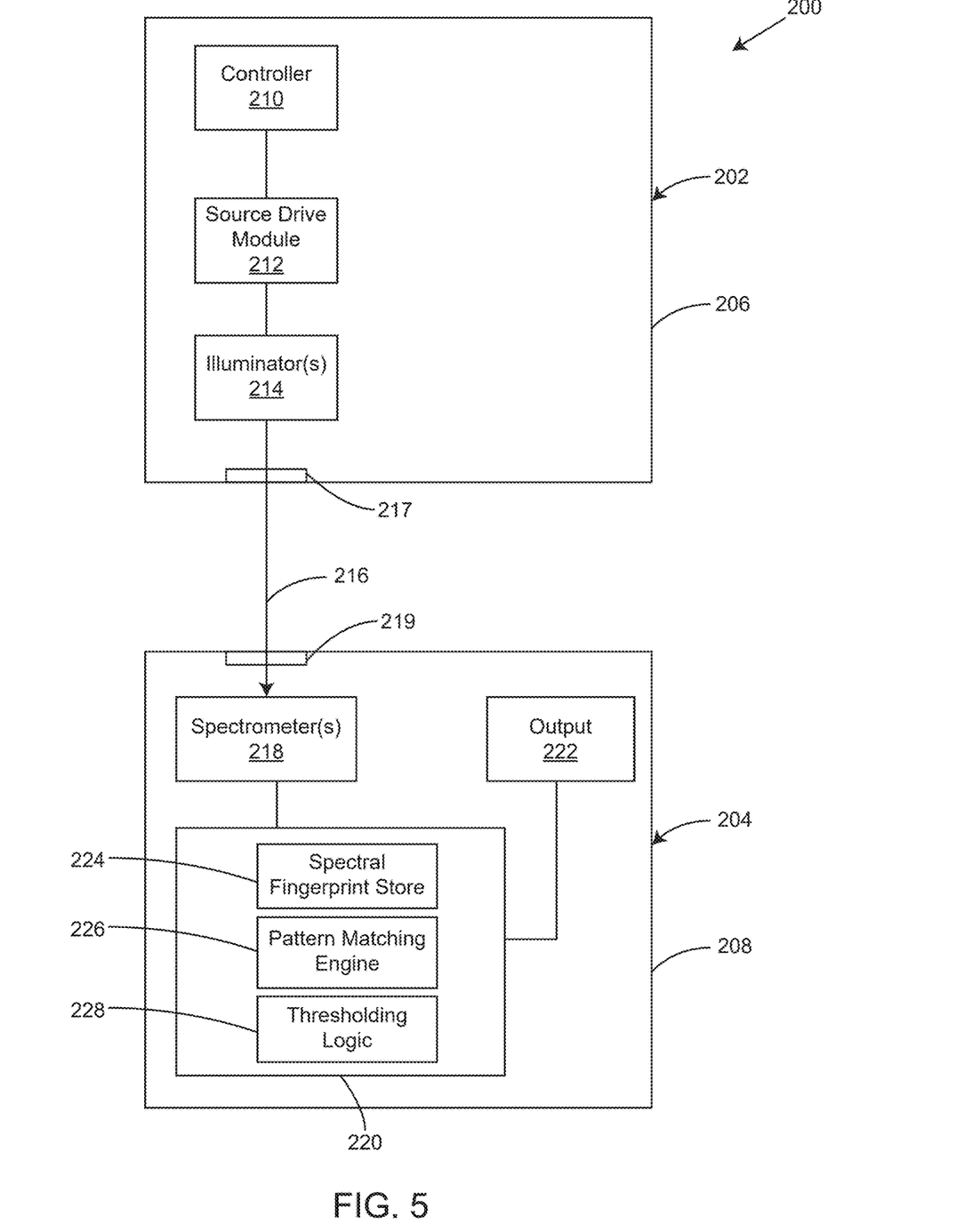
FIG. 5 is a system block diagram of an open path gas detection system in accordance with an embodiment of the present invention.

FIG. 5 is a system block diagram of an open path gas detection system in accordance with an embodiment of the present invention. Open path gas detection system 200 includes transmitter 202 and receiver 204. Each of transmitter 202 and receiver 204 are housed within respective housings 206, 208.

Many of the environments in which open path gas detectors operate are highly volatile or explosive and could be ignited by a spark or elevated surface temperature in the gas detection system. Thus, for such gas detection systems, it is highly desirable to comply with explosion-proof ratings. Such ratings require that any explosion or flame generated within a complying electrical device will not ignite the environment of the device. These ratings drive such design constraints as housing wall thickness and material and the provision of a flame quenching pathway from an interior of the device to the external environment. One example of an explosion-proof rating is an ATEX certification to Ex-d standards EN60079-0 and EN60079-1 for potentially explosive atmospheres. Generally, explosion-proof housings are relatively bulky in order to be mechanically robust enough to contain an internal explosion without rupturing. Generally, such explosion-proof containers are very robust metal enclosures that are designed to withstand explosive pressures. However, for optical devices, the enclosure must accommodate a window of some sort in order to allow the illumination to pass through to the environment.

Another way to protect hazardous environments is to require that devices operating therein comply with intrinsic safety requirements. When the electronics are intrinsically safe, they inherently cannot generate the required temperature or spark to generate an explosion, even under fault conditions. An example of an intrinsic safety specification is the standard promulgated by Factory Mutual Research in October 1998 entitled APPROVAL STANDARD INTRINSICALLY SAFE APPARATUS AND ASSOCIATED APPARATUS FOR USE IN CLASS I, II, AND III, DIVISION 1 HAZARDOUS (CLASSIFIED) LOCATIONS, CLASS NUMBER 3610. Intrinsic safety requirements generally specify such low energy levels that compliance is simply not possible with circuitry that involves high voltages, high currents, and/or high wattage, such as AC circuits. In at least some embodiments described herein, the circuitry is designed and configured to comply with an intrinsic safety requirement, such as that set forth above.

Embodiments described herein preferably include explosion-proof housings 206, 208 and/or circuitry within transmitter 202 and/or receiver 204 that complies with an intrinsic safety specification.

Transmitter 202 includes controller 210 coupled to source laser drive module 212. Source laser drive module 310 can include power handling components as well as frequency control and pulse generation logic such that upon receiving a signal from controller 210, source laser drive module 212 is configured to cause illuminator module 214 to generate a suitable pulse or signal 216 toward receiver 204 through housing window 217. Illuminator 214 can include one or more individual illuminators, such as a xenon lamp and/or a laser source. Controller 210 can be any suitable arrangement of circuitry or logic that is able to cause laser drive module 212 to generate a pulse or signal 216. In one embodiment, controller 210 is a microprocessor.

Receiver 204 includes one or more spectrometers 218 positioned near window 219 in housing 208. The one or more spectrometers 218 may be of the types described above and are coupled to controller 220. Each spectrometer is able to simultaneously capture spectrographic information from the pulse or signal 216 after the pulse or signal 216 has passed through the open path. One spectrometer may be configured to obtain spectroscopic information in one particular region, such as 1.9-2.6 µm while another spectrometer is configured to obtain spectroscopic information in another region, such as UV. The one or more spectrometers 218 are coupled to controller 220 to provide their spectroscopic information to controller 220. Controller 220 can be any suitable arrangement of circuitry or logic that is able to receive the spectroscopic information from the one or more spectrometers 218 and generate useful gas detection information and provide such gas detection information to output module 222. In one embodiment, controller 220 is a microprocessor. Output module may include a local display, a local alarm output, and/or a wireless communication module that is configured to interact with one or more remote systems to provide the output.

Controller 220 includes a spectroscopic fingerprint store 224, which contains spectroscopic fingerprint information for at least one gas species to be detected. Such spectroscopic fingerprint information generally includes wavelengths at which the particular gas has an absorption line(s). Store 224 may include a number of absorption wavelengths for each gas and may store such information for a vast number of different gases. Additionally, or alternatively, fingerprint store 224 may include a digitized representation of transmittance vs. wavelength for each gas of interest over various frequency regions, such as NIR, MIDIR, SWIR and/or UV. Controller 220 is configured, through hardware, software, or a combination thereof, to provide pattern matching engine 226. Pattern matching engine 226 receives the spectroscopic information from the one or more spectrometers and applies known pattern matching techniques to identify one or more gases having spectral fingerprints that match the detected spectral information. The output of pattern matching engine, in one embodiment, is a listing of potentially detected gases along with an indication of confidence or probability. In this embodiment, the output of pattern matching engine 226 is provided to thresholding logic 228 to select one or more gas detection outputs based on whether the confidence or probability exceeds a threshold, such as a pre-defined threshold, or a threshold that is based on a statistical function (such as standard deviation) of the probability over a recent (e.g., 1 hour) time window.

Figure 6:
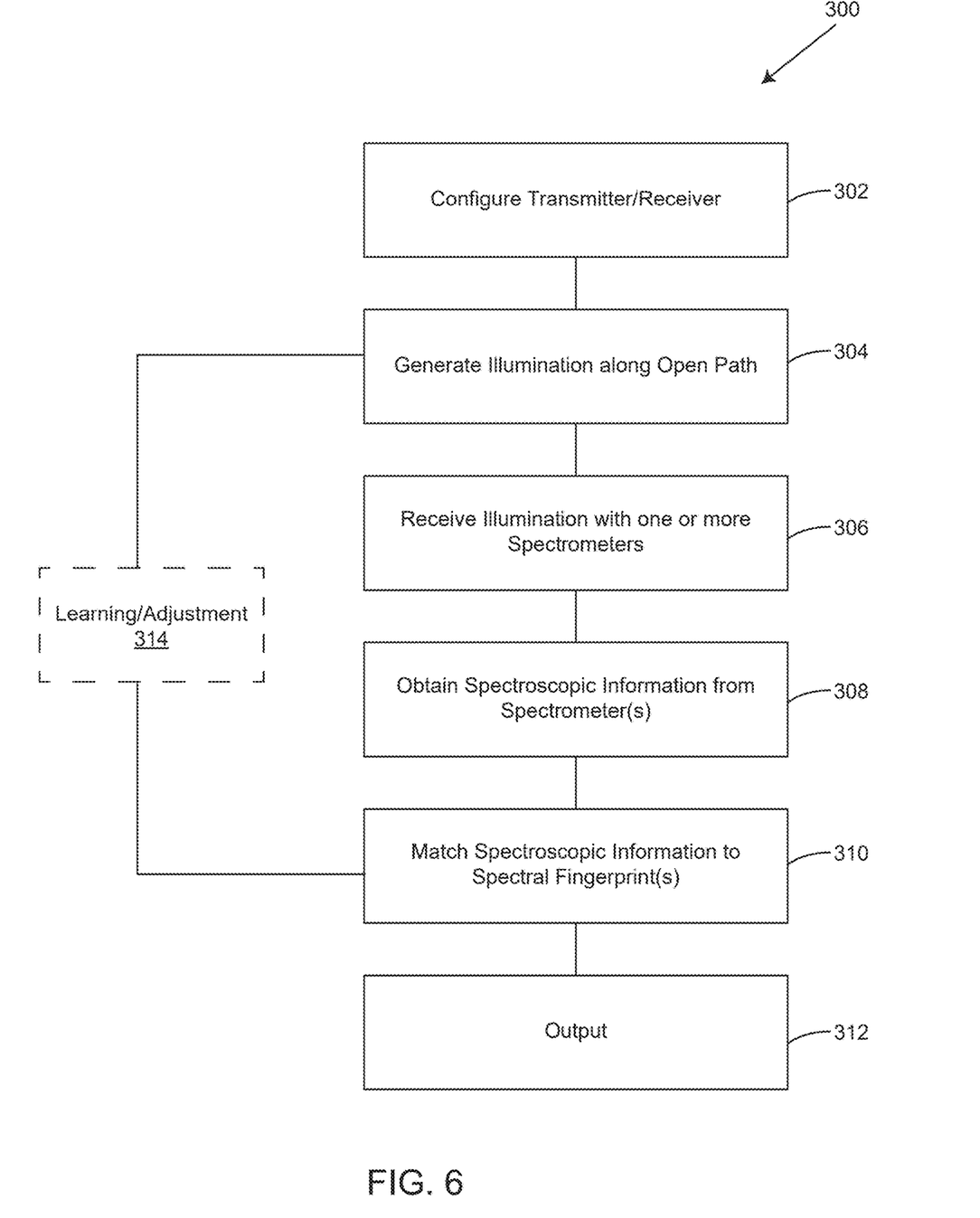
FIG. 6 is a flow diagram of a method of operating an open path gas detection system in accordance with an embodiment of the present invention.

FIG. 6 is a flow diagram of a method of operating an open path gas detection system in accordance with an embodiment of the present invention. Method 300 begins at block 302 where the open path gas transmitter and receiver are configured. In one example, such configuration simply requires mounting the two devices to define an open optical path along which gas detection is desired. However, other initial setup operations can also be done, such as selecting one or more gases for detection among a larger set of all known gases having spectral fingerprint stored in the receiver. When a subset of gasses is selected, pattern matching, and thresholding are simplified and potentially more accurate. Next, at block 304, the transmitter generates illumination along the open path. This illumination may be from one or more lasers having defined spectral characteristics or, alternatively, the illumination may be a relatively broad-spectrum pulse, such as a flash from a xenon lamp. As set forth above, this illumination interacts with molecules of gas along the open path, which affects the spectral composition of the illumination reaches the receiver. At block 306, the receiver receives the illumination that has passed through the open path with one or more spectrometers that are located within the receiver. The spectrometers generate spectroscopic information based on the amplitude of the illumination at various wavelengths. As set forth above, such spectrometers may include one or more two-dimensional CCD arrays. At block 308 the one or more spectrometers provide their respective spectroscopic information to a controller, (such as by reading out a CCD array). At block 310, controller performs a pattern matching process using the received spectroscopic information and one or more spectral fingerprints stored in the controller or memory coupled to the controller. The results of the matching process are used by the controller to generate an output, as indicated at block 312. The output may be provided locally and/or communicated wirelessly to a remote device, such as a process controller. As shown at dashed block 314, the method optionally includes learning and/or adjusting the spectroscopic detection and/or matching process over time, since method 300 iterates by returning to block 304. Examples of such adjustment include changing the intensity and/or wavelength distribution of the initial illumination provided by the source. For example, where a broadband source was used, such adjustment may include switching to a laser illumination source. Another example of an adjustment includes varying either the matching process or parameters within thresholding logic 228 in response to environmental variations, such as interference from water vapor, steam or rain.

Although the present invention has been described with reference to preferred embodiments, workers skilled in the art will recognize that changes may be made in form and detail without departing from the spirit and scope of the invention.

What is claimed is:

1. An open path gas identification system comprising:
a transmitter configured to generate illumination across an open path, the illumination having broadband spectrum;
a receiver positioned to detect the illumination from the transmitter after the illumination has passed through the open path, the receiver including at least one spectrometer configured to determine spectroscopic information, wherein the spectroscopic information comprises a ratio of a first signal wavelength intensity to a first reference wavelength intensity and a ratio of a second signal wavelength intensity to a second reference wavelength intensity;
wherein the receiver includes memory storing a plurality of spectral fingerprints related to a plurality of gases, wherein each spectral fingerprint includes a plurality of wavelengths at which a particular gas has an absorption line, the receiver further including a controller that is configured to provide a pattern matching engine that receives the spectroscopic information and applies a pattern matching function to identify at least one gas of interest within a plurality of gases based on the spectroscopic information and the plurality of spectral fingerprints and provide an output based on the identification of at least one gas of interest.

2. The open path gas identification system of claim 1, wherein the receiver includes a controller configured to match the spectrographic information to at least one of the plurality of spectral fingerprints to detect the at least one gas of interest.

3. The open path gas identification system of claim 2, wherein the controller is configured to compare the identification of the at least one gas of interest to a threshold to provide the output.

4. The open path gas identification system of claim 1, wherein the at least one spectrometer includes an NIR spectrometer.

5. The open path gas identification system of claim 1, wherein the at least one spectrometer includes an MIDIR spectrometer.

6. The open path gas identification system of claim 1, wherein the at least one spectrometer includes a SWIR spectrometer.

7. The open path gas identification system of claim 1, wherein the at least one spectrometer includes a UV spectrometer.

8. The open path gas identification system of claim 1, wherein the at least one spectrometer includes a plurality of spectrometers.

9. The open path gas identification system of claim 1, wherein the receiver includes an explosion-proof housing and the at least one spectrometer is disposed proximate a window of the explosion-proof housing.

10. The open path gas identification system of claim 1, wherein the receiver is configured to perform an adjustment based on the spectroscopic information.

11. The open path gas identification system of claim 1, wherein the output is provided locally.

12. The open path gas identification system of claim 1, wherein the receiver is configured to provide the output wirelessly to a remote device.

13. The open path gas identification system of claim 1, wherein the transmitter includes collimating optics that collimate the illumination that passes through the open path.

14. The open path gas identification system of claim 1, wherein the transmitter is configured to vary the illumination by adjusting the illumination intensity.

15. The open path gas identification system of claim 1, wherein the transmitter is configured to vary the illumination by adjusting the wavelength distribution.

16. The open path gas identification system of claim 1, wherein the transmitter is configured to vary switching to laser illumination.

17. The open path gas identification system of claim 1, wherein the transmitter is configured to vary that illumination across the open path based on the output by varying at least one of illumination type, illumination intensity, and wavelength distribution and wherein varying of at least one illumination type, illumination intensity, and wavelength distribution is configured to detect only gases of interest.

18. The open path gas identification system of claim 1, wherein the output is a listing of potentially detected gases along with an indication of confidence.

* * * * *